United States Patent [19]

Shoji et al.

[11] Patent Number: 5,157,445
[45] Date of Patent: Oct. 20, 1992

[54] FIXING DEVICE

[75] Inventors: Yoshio Shoji; Yasuhiro Uehara; Yasuji Fukase, all of Ebina, Japan

[73] Assignee: Fuji Xerox Co., Ltd., Tokyo, Japan

[21] Appl. No.: 683,806

[22] Filed: Apr. 11, 1991

[30] Foreign Application Priority Data

Apr. 12, 1990 [JP] Japan .................................. 2-094976

[51] Int. Cl.⁵ ............................................ G30G 15/20
[52] U.S. Cl. .................................. 355/284; 355/282; 118/60; 430/99; 430/124
[58] Field of Search ................... 118/60; 355/284, 282; 430/99, 124

[56] References Cited

U.S. PATENT DOCUMENTS

| | | | |
|---|---|---|---|
| 4,064,313 | 12/1977 | Takiguichi et al. | 118/60 X |
| 4,659,621 | 4/1987 | Finn et al. | 118/60 X |
| 4,810,564 | 3/1989 | Takahashi et al. | 355/284 X |

FOREIGN PATENT DOCUMENTS

| | | |
|---|---|---|
| 59-215848 | 12/1984 | Japan . |
| 62-226175 | 3/1986 | Japan . |
| 3-33785 | 2/1991 | Japan . |
| 1509247 | 5/1978 | United Kingdom . |

OTHER PUBLICATIONS

United Kingdom Patent Office Search Report, May 5, 1991.

Primary Examiner—A. T. Grimley
Assistant Examiner—P. J. Stanzione
Attorney, Agent, or Firm—Finnegan, Henderson, Farabow, Garrett and Dunner

[57] ABSTRACT

Disclosed is a fixing device where a copying medium carrying a non-fixed toner image thereon is passed between a pair of fixing rolls as being kept in direct contact with each other under pressure so as to fix the non-fixed toner image on the copying medium, the device being characterized in that a toner release at least containing, as an active ingredient, a functional group-containing organopolysiloxane of a general formula (I):

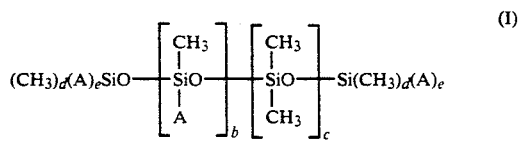

the organopolysiloxane having a viscosity of from 10 to 100,000 cs at 25° C., is supplied to at least the fixing roll of being brought into contact with the non-fixed toner image of the said pair of fixing rolls. Using the toner release, the copying medium releasability from the fixing roll to which the toner release is applied is good and the heat-resistance of the fixing roll is also good.

4 Claims, 8 Drawing Sheets

FIXING DEVICE

FIELD OF THE INVENTION

The present invention relates to a fixing method, which is used in an image forming apparatus such as an electrophotographic duplicator or printer and in which a copying medium carrying a non-fixed toner image thereon is passed between a pair of rolls as being kept in direct contact with each other under pressure so as to fix the non-fixed toner image onto the copying medium, as well as to a fixing device for the method. In particular, it relates to a fixing method where the releasability of the toner from the fixing roll has been improved and to a fixing device for the method.

BACKGROUND OF THE INVENTION

As conventional fixing methods and devices which have heretofore been employed in the image forming apparatus of the kind, for example, those disclosed in Japanese Patent Publication No. 59-4699, Japanese Patent application Laid-Open Nos. 59-74579 and 60-129768 are known. One example of the known fixing method and device is illustrated in FIG. 9, where the essential part is composed of a heat roll (100) which has a heat source in the inside thereof and which rotates to the direction of the indicated arrow, a pressure roll (101) which is arranged to be kept in direct contact with the heat roll (100) under pressure and which rotates to the direction of the indicated arrow, and a toner release supply means (102), which is fitted to the heat roll (100) to supply a toner release for prevention of toner offset to the outer surface of the heat roll (100). In accordance with the illustrated method and device, a copying paper (103) carrying a non-fixed toner image thereon is inserted and passed between the heat roll (100) and the pressure roll (101) to thereby fix the toner image on the paper.

Precisely, the heat roll (100) is composed of a base roll (104) having a heat source in the inside thereof, an inner elastic material layer (105) as provided on the base roll (104), and an outer elastic material layer (106) which is made of an elastic material, such as a fluorine-containing rubber, having an affinity with the toner release for prevention of toner offset and having an abrasion-resistant property, and which is provided on the inner elastic material layer (105). The heat roll (100) having such a constitution is brought into contact with the copying paper (103) under a pertinent pressure and with a pertinent contact width because of the elastic action of the inner elastic material layer (105), while the toner offset phenomenon is prevented by the function of the toner release to be supplied to the outer elastic material layer (106).

As the toner release to be coated on the surface of the heat roll (100), for example, a polydimethylsiloxane having an ordinary silicone oil base is generally employed.

Recently, Viton Rubber (trade name by DuPont), which is a fluorine-containing rubber having excellent heat-resistance and abrasion-resistance, is often used as the outer elastic material layer (106) of the heat roll (100). However, since Viton Rubber has a poor affinity with the polydimethylsiloxane as a toner release, there is a problem that the outer elastic material layer made of the rubber could not have a sufficient releasability.

In order to overcome the problem, use of a mercapto-modified silicone oil, which has a mercapto group having a high affinity with Viton Rubber to be used as the outer elastic material layer (106) of the heat roll (100), as a toner release has been proposed, and the oil has actually been put to practical use as the agent.

However, the above-mentioned prior art has the following problems.

Precisely, where such a mercapto-modified silicone oil having a high affinity with Viton Rubber to be used as the outer elastic material layer of a heat roll is used as a tone release, the mercapto-modified silicone oil would gel by chemical reaction under heat during use for a long period of time to thereby lower the heat-resistance of the heat roll.

Additionally, where the surface temperature of the heat roll is set high so as to improve the fixability of the toner image to be formed on a copying medium, the mercapto-modified silicone oil would be deteriorated to often shorten the life of the heat roll.

In a color duplicator, as formation of images is effected by the user of plural toners such as cyan, magenta and yellow toners, the amount of the toners to be fixed is large. Further, since toners having a low melting point are used in the case for the purpose of improving the color forming property, such toners are generally highly viscous so that the toner release to be used in the case is needed to have a high releasability. Despite of the situation, the conventional toner releases applicable to the case have a problem that the releasability is insufficient.

SUMMARY OF THE INVENTION

Accordingly, the present invention has been effected for the purposes of overcoming the above-mentioned problems in the prior art, and the object of the invention is to provide a fixing method of using a satisfactory toner release capable of displaying an excellent releasability on the surface of the fixing roll and to provide a fixing device for the method.

Additionally, another object of the present invention is to provide a fixing method and a fixing device for the method, where a toner release which may give a sufficient toner-releasability to the surface of a fixing roll and which has an excellent heat-resistance to be sufficiently durable to use for a long period of time at a high temperature is used.

Still another object of the present invention is to provide a fixing method and a fixing device for the method where even a fluorine-containing rubber such as Viton Rubber, having a high heat-resistance and a high abrasion-resistance, is used as the outer elastic material layer of a fixing roll to which the toner release is supplied with a sufficient releasability and a high heat-resistance and the fixing roll is sufficiently durable to use for a long period of time.

Specifically, there is provided in accordance with the present invention a fixing method where a copying medium carrying a non-fixed toner image thereon is pass between a pair of fixing rolls as being kept in direct contact with each other under pressure so as to fix the non-fixed toner image on the copying medium, the method being characterized in that a toner release at least containing, as an active ingredient, a functional group-containing organopolysiloxane of a general formula (I):

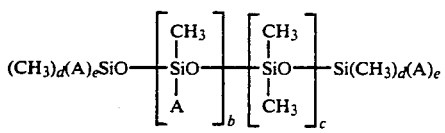

(I)

where A represents —R¹—X or —R¹—O—Y$_f$—H (in which R¹ represents an alkylene group having from 1 to 8 carbon atoms; X represents —NH$_2$ or —NER²NH$_2$ with R² of being an alkylene group having from 1 to 8 carbon atoms; Y represents an alkylene group having from 2 to 4 carbon atoms; and f represents an integer of from 0 to 10); b and c each satisfy the conditions of $0 \leq b \leq 10$ and $10 \leq c \leq 1,000$ but both b and c must not be 0 at the same time; and d is 2 or 3, e is 0 or 1, and d+e=3; the organopolysiloxane having a viscosity of from 10 to 100,000 cst at 25° C., is supplied to at least the fixing roll of being brought into contact with the non-fixed toner image of the said pair of fixing rolls. Also provided in accordance with the present invention is a fixing device as equipped with such a toner release supplying means for carrying out the fixing method.

DETAILED DESCRIPTION OF THE INVENTION

Figure 1:
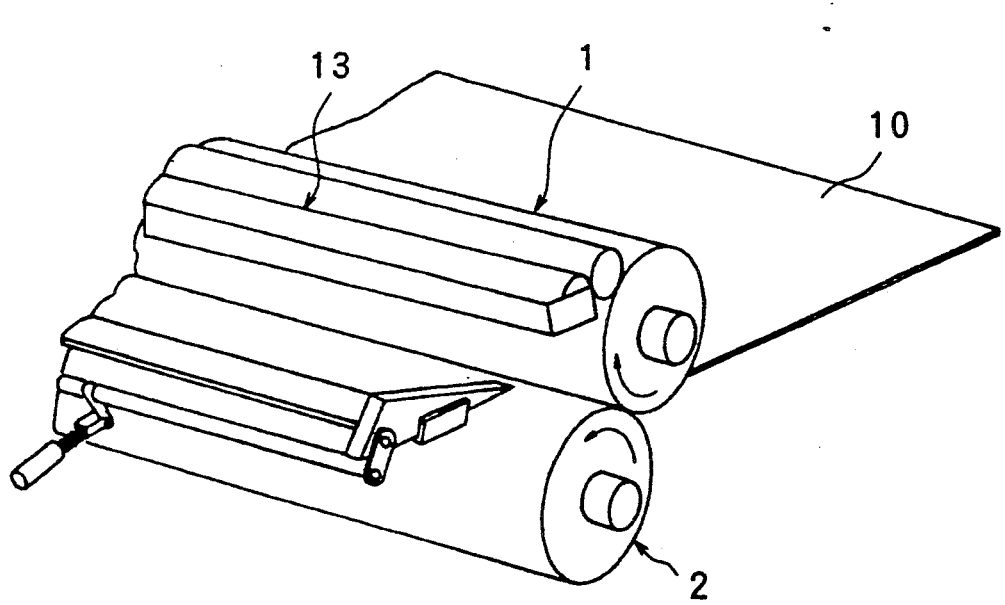
FIG. 1 is a perspective explanatory view of showing a fixing device used in Example 1 of the invention.

The active ingredient of the toner release to be used in the fixing method and device of the present invention is a functional group-containing organopolysiloxane which is represented by the above-mentioned general formula (I) and which has a viscosity of from 10 to 100,000 cst at 25° C., and it is preferably a functional group-containing organopolysiloxane to be represented by a general formula (II):

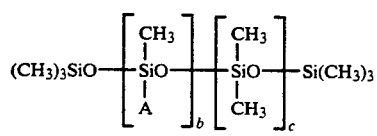

(II)

where A represents —R¹—X, in which R¹ represents an alkylene group having from 1 to 8 carbon atoms, and X represents —NH$_2$; and b and c each satisfy the conditions of $0 < b \leq 10$ and $10 \leq c \leq 1,000$. As preferred examples of such functional group-containing organopolysiloxanes, the following are referred to.

Amine-modified oil $\alpha_1$: formula (I)
d=3 and e=0, and
A (in the chain moiety)=—CH$_2$CH$_2$CH$_2$NHCH$_2$CH$_2$NH$_2$ Amine-modified oil $\alpha_2$: formula (I)
d=2 and e=1 (at one end), d=3 and e=0 (at the other end), and
A (in the chain moiety)=—CH$_2$CH$_2$CH$_2$NHCH$_2$CH$_2$NH$_2$
A (at one end)=—CH$_2$CH$_2$CH$_2$NH$_2$ Amine-modified oil $\beta$: formula (II)
d=3 and e=0, and
A (in the chain moiety)=—CH$_2$CH$_2$CH$_2$NH$_2$ Especially preferred is the above-mentioned amine-modified oil $\beta$.

The toner release to be used in the present invention may contain, as another active ingredient, an organopolysiloxane of a general formula (III):

(III)

where R⁵ represents an alkyl or aryl group having from 1 to 8 carbon atoms, and $1.95 < a < 2.20$. In the organopolysiloxane of formula (III), the substituent R⁵ may be one or more hydrocarbons selected from alkyl groups such as methyl group, ethyl group, propyl group, butyl group, pentyl group, hexyl group, heptyl group and octyl group and aryl groups such as phenyl group and tolyl group. Of the formula (III) preferred are those of a formula:

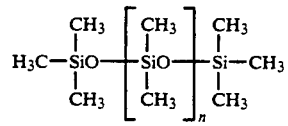

where n is an integer of form 1 to 1,000. As an especially preferred example of the compounds, there is mentioned, for example:

Dimethyl oil $\gamma$: dimethylpolysiloxane of formula (III)

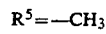

Further, the toner release of the present invention may also contain, as still another active ingredient, an aromatic amino group-containing organopolysiloxane of a general formula (IV):

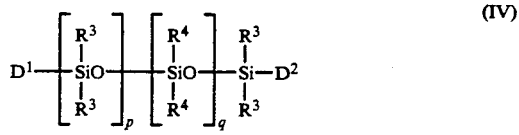

(IV)

where R³ represents an alkyl or aryl group having from 1 to 8 carbon atoms; R⁴ represents an aromatic amino group of a formula:

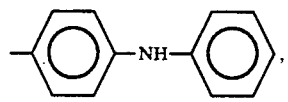

-continued

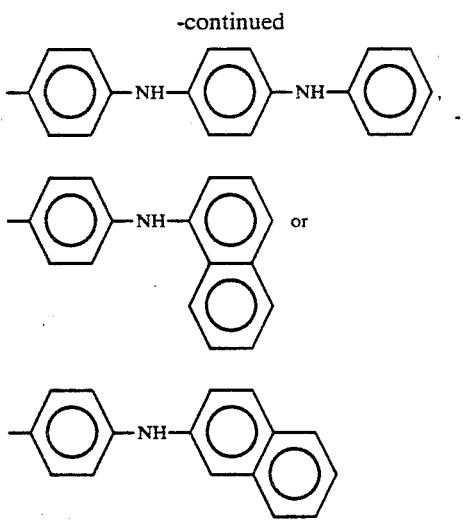

$D^1$ and $D^2$ each represents the above-mentioned $R^3$ or $-O-R^4$; p and q each satisfy the conditions of being $0 \leq p \leq 100$ and $0 \leq q \leq 10$; and when q=0, at least one of $D^1$ and $D^2$ is $-O-R^4$. As one preferred example of such aromatic amino group-containing organopolysiloxanes, for example, the following compound is referred to:

Aromatic amine-modified oil δ: formula (IV)
D1 and D2 = —CH3; R3 = —CH3;
one R4 = —CH3; and
the other

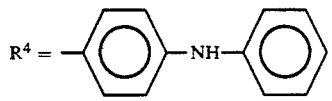

The above-mentioned pair of fixing rolls to be used in the fixing method and device of the present invention is composed of, for example, a heat roll having a heat source in the inside thereof and a pressure roll also having a heat source in the inside thereof, with which fixation is conducted under heat and pressure. However, the system of the fixing rolls to be used in the present invention is not whatsoever defined to only the illustrated one but any other system in which only the heat roll has a heat source or the both rolls are metal rolls for conducting fixation only under heat may also be employed.

As the toner release supplying means for supplying the above-mentioned toner release to the surface of the fixing means, for example, one in which a toner release as stored in an oil pan is supplied to the surface of a fixing roll with a coating roll which is kept in contact with the surface of the fixing roll. However, this is not whatsoever limitation but any other system where a toner release is supplied to the surface of a fixing roll by coating it thereon with a web into which a toner release has been infiltrated may also be employed.

The present inventors carried out various experiments for finding out a toner release which may well be applied even to a fixing roll having an outer elastic material layer made of Viton Rubber of a fluorine-containing rubber with excellent heat-resistance and abrasion-resistance and which displays not only an excellent releasability but also a sufficient heat-resistance to be satisfactorily durable to use for a long period of time at a high temperature. As a result, they have found that a toner release composition containing two kinds of amine-modified oils having the above-mentioned structural formulae is fully durable to use for a long period of time at a high temperature.

Next, the fixing method and device of the present invention will be explained in more detail on the basis of the following examples, experimental examples and comparative examples and with reference to the drawings attached hereto.

In the following examples, experimental examples and referential examples, the following compounds were used as a base oil of constituting a toner release.

As amine-modified oil $\alpha_1$ of formula (I)
  Amine A Oil: amine equivalent of 40,000
  Amine B Oil: amine equivalent of 139,000
  Amine C Oil: amine equivalent of 195,000
  Amine D Oil: amine equivalent of 7,640
As amine-modified oil $\alpha_2$ of formula (II)
  Amine E Oil: amine equivalent of 32,500
As amine-modified oil $\beta$ of formula (II)
  Amine F Oil: amine equivalent of 28,600
  Amine G Oil: amine equivalent of 36,500
As organopolysiloxane of formula (III)
  Dimethyl Oil γ: viscosity of 300 cs
As aromatic amino group-containing organopolysiloxane of formula (IV)
  Aromatic Amine-Modified Oil δ
As other base oil
  Mercapto-Modified Oil: Mercapto-Modified Silicone Oil (product by SWS Co., USA, viscosity of 270 cs)

"Amine equivalent" as referred to herein indicates a value to be obtained by dividing the total molecular weight of the compound by the number of amino groups therein.

EXAMPLE 1

Figure 2:
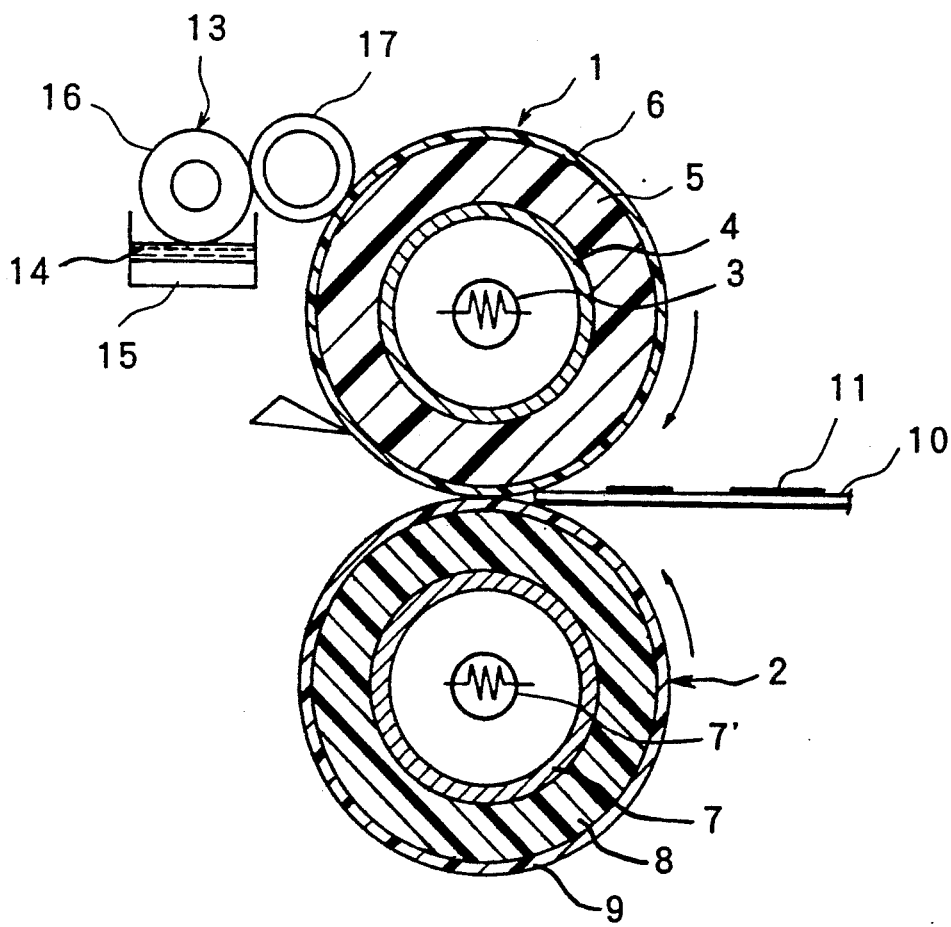
FIG. 2 is a cross-sectional explanatory view of FIG. 1.
Figure 3:
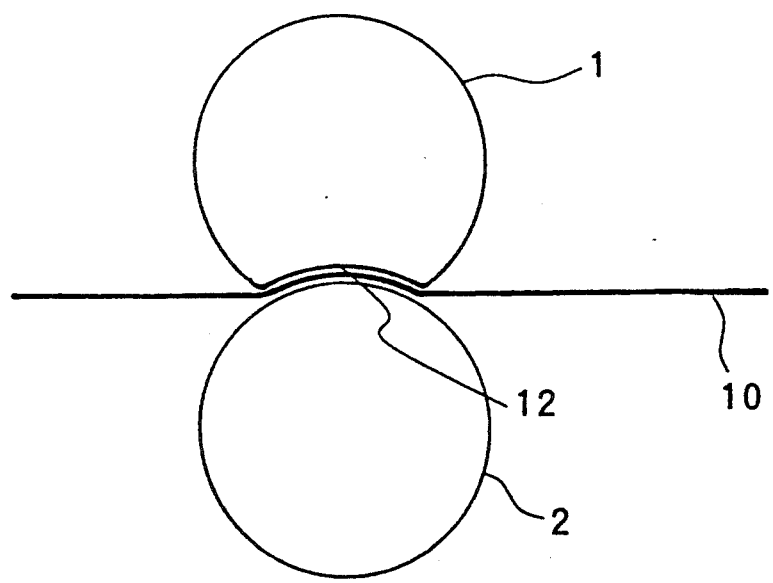
FIG. 3 is a schematic view of showing a deformed condition of rolls during fixation.

FIG. 1 and FIG. 2 are referred to, which illustrate one embodiment of the fixing method and device of the present invention. The main part of the fixing device is composed of a heat roll (1) and a pressure roll (2) as shown in FIG. 2.

The heat roll (1) has a 500-W Quartz Lamp (3) in the inside thereof, and it is composed of a base roll (4), which has an outer diameter of 44 mmφ and is made of a steel core material, an inner elastic material layer (5), which is provided on the base roll (4) optionally via a proper primer therebetween and which is made of a blend as prepared by well blending 100 parts by weight of a silicone compound (SH841U, product by Toray Co.), 100 parts by weight of a crystalline silica and 0.8 part by weight of a vulcanizing agent (RC-4, product by Toray Co.), the rubber hardness of the vulcanized layer (5) being 60° as JIS hardness and the thickness (t) thereof being 3 mm, and an outer elastic material layer (6), which is provided on the inner elastic material layer (5) and which is made of a blend as prepared by well blending 100 parts by weight of a fluorine-containing rubber (for example, Viton Rubber B-50, product by DuPont Co.), 2 parts by weight of a carbon (Thermal Black MT, product by Cabbot Co.) and 10 parts by weight of a magnesium oxide (MgO #30, product by Kyowa Chemical Co.), the thickness (t) of the layer (6) being 40 μm.

The other pressure roll (2) has a 500-W Quartz Lamp (7'), in the inside thereof, and it is composed of a base roll (7), which has an outer diameter of 48 mmφ and is made of a steel core material, an inner elastic material layer (8), which is provided on the base roll (7) optionally via a proper primer therebetween and which is made of a blend as prepared by well blending 100 parts by weight of a silicone compound (SH841U, product by Toray Co.), 50 parts by weight of a crystalline silica and 0.8 part by weight of a vulcanizing agent (RC-4, product by Toray Co.), the rubber hardness of the vulcanized layer (8) being 60° as JIS hardness and the thickness (t) thereof being 1 mm, and an outer elastic material layer (9), which is provided on the inner elastic material layer (8) and which is made of a blend as prepared by well blending 100 parts by weight of a fluorine-containing rubber (for example, Viton Rubber B-50, product by DuPont Co.), 2 parts by weight of a carbon (Thermal Black MT, product by Cabbot Co.) and 10 parts by weight of a magnesium oxide (MgO #30, product by Kyowa Chemical Co.), the thickness (t) of the layer (9) being 40 μm.

The heat roll (1) and the pressure roll (2) are kept in direct contact with each other under pressure by means of a pressure mechanism (not shown), and they form a nip width of 6 mm at the center part. In general, the heat roll (1) is set to have a surface temperature of 140° C. and the pressure roll (2) to have a surface temperature of 130° C. The heat roll (1) and the pressure roll (2) are rotated each to the indicated direction at a surface speed of 150 mm/sec.

The copying paper (10) of a copying medium which is to be fixed by the fixing device carries a non-fixed toner image (11) on the surface thereof, as shown in FIG. 2. The non-fixed toner image (11) may be, for example, a color toner image composed of three colors of cyan, magenta and yellow.

The color toner image (11) is formed of a color toner comprising, for example, three colors of cyan, magenta and yellow each having the following composition.

| Cyan Toner: | Polyester Resin | 96 wt. pts. |
| | Antistatic Agent | 1 wt. pt. |
| | Cyan Pigment | 3 wt. pts. |
| Magenta Toner: | Polyester Resin | 96 wt. pts. |
| | Antistatic Agent | 1 wt. pt. |
| | Magenta Pigment | 3 wt. pts. |
| Yellow Toner: | Polyester Resin | 96 wt. pts. |
| | Antistatic Agent | 1 wt. pt. |
| | Yellow Pigment | 3 wt. pts. |

The copying paper (10) having a non-fixed color toner image (11) on the surface thereof is inserted between the heat roll (1) and the pressure roll (2) and passed therethrough, whereupon the heat energy derived from the Quartz Lamp (3) as arranged in the inside of the heat roll (1) is supplied to the non-fixed toner image (11), neither too much nor too less, via the inner elastic material layer (5) and then the outer elastic material (6) thereby to fix the toner image (11) on the copying paper (10) under heat and pressure.

In the fixing device as used in Example 1, both the inner elastic material layer (5) of the heat roll (1) and the inner elastic material layer (8) of the pressure roll (2) are made of the same Viton Rubber having the same rubber hardness, but the thickness of the former of the inner elastic material layer (5) of the heat roll (1) is larger than the latter. Therefore, in the condition where the heat roll (1) and the pressure roll (2) are kept in direct contact with each other under pressure, the inner elastic material layer (5) of the heat roll (1) is depressed by the pressure roll (2) and is deformed to a depressed shape so that a depression (12) is formed in the contact area of the inner elastic material layer (5) of the heat roll (1). Accordingly, in the case where the depression (12) is formed in the side of the heat roll (1), the copying paper (10) is deformed to the same shape as the depression (12) of the heat roll (1) while the paper (10) passes through the nip part between the heat roll (1) and the pressure roll (2). Therefore, the moving speed of the copying paper (10) is made higher in the nip part by the proportion of the length of the outer periphery of the heat roll (1) as deformed in the form of a depression longer than the length of that of the non-deformed pressure roll (2) and, as a result, a so-called "squeezing power" which is to separate the surface of the copying paper (10) from the surface of the heat roll (1) is imparted to the copying paper (10) while the paper (10) passes through the nip part between the heat roll (1) and the pressure roll (2). Because of the reasons, the copying paper (10) may better be separated from the heat roll (1) after fixation of the toner image on the paper (10), without the paper (10) being attached to and engulfed in the roll (1), in combination with the anti-offset offset effect of the toner release which will be mentioned below. Accordingly, even in a fixing device where a large amount of an easily offsetting color toner is fixed, attaching and engulfing of the copying paper (10) to the heat roll (1) may effectively be prevented.

The surface of the heat roll (1) is equipped with a toner release supply means (13). The toner release supply means (13) is composed of an oil pan (15) which keeps a toner release (14) therein, a supply roll (16) the bottom of which has been dipped in the toner release (14) as stored in the oil pan (15), and a coating roll (17) which is kept in contact with both the supply roll (16) and the heat roll (1). In the constitution, the toner release (14) is coated on the surface of the heat roll (1) in a determined amount (for example, in such an amount that may form a toner release coat having a thickness of approximately 0.1 μm on the copying paper (10)) via the coating roll (17).

In the present Example 1, an oil composition having a viscosity of 300 cst and obtained by blending 1,000 parts by weight of an amine-modified oil $\alpha_1$ of the above-mentioned formula (I) of Amine A Oil (amine equivalent of 40,000) and 1 part by weight of an aromatic amino group-containing organopolysiloxane of the above-mentioned formula (IV) of Aromatic Amine-Modified Oil δ was used as the toner release (14).

EXPERIMENTAL EXAMPLE 1

The present inventors actually made the device of FIG. 1 by way of trial and used it in a releasability test (initial test) where a copying paper (10) carrying a color toner image (11) thereon is processed for fixation of the image thereon to examine as to whether or not the toner offsets and the copying paper (10) is attached and engulfed to the heat roll (1).

As the color toner image (11), three color toners of cyan, magenta and yellow were carried on the copying paper (10) each in an amount of 0.7 mg/cm$^2$, totaling 2.1 mg/cm$^2$. As the copying paper (10), either a thick paper (65 g/m$^2$) or a thin paper (56 g/m$^2$) was used. In both cases, the paper was conveyed in either the lengthwise direction or the crosswise direction for effecting the releasability test. In the test, the surface temperature of the heat roll (1) was varied from 120° C. to 180° C. at intervals of every 20° C., while that of the pressure roll (2) was constant to be 130° C. The experimental results of the copying paper releasability test are shown in Table 1 below.

TABLE 1

| Copying Paper | Surface Temp. of Heat Roll | | | |
|---|---|---|---|---|
| | 120° C. | 140° C. | 160° C. | 180° C. |
| Thick Paper | | | | |
| Lengthwise Direction | O | O | O | O |
| Crosswise Direction | O | O | O | Δ |
| Thin Paper | | | | |
| Lengthwise Direction | O | O | O | O |
| Crosswise Direction | O | O | O | X |

In Table 1 above, "O" indicates that the copying paper (10) was well released from the roll with no problem; "Δ" indicates that the latter half of the copying paper (10) partly offset; and "X" indicates that the copying paper (10) attached to and engulfed into the heat roll (1) from the top thereof.

As is obvious from the results, fixation was well carried out by the use of the fixing device of the present invention in a temperature range of from 120° C. to 160° C. with no problem. Regarding the paper feeding system, it is understood that the lengthwise feeding system may well be carried out with no problem in a temperature range of from 120° C. to 180° C.

EXPERIMENTAL EXAMPLE 2

Next, a running test was carried out under the same condition as that in Experimental Example 1, except that the temperature of the heat roll (1) was fixed to be 140° C. and as the copying paper (10) a thick paper was continuously processed for fixation in a total amount of 30,000 copies under the condition of crosswise feeding.

As a result of the test, no gel product was formed both on the surface of the heat roll (1) and on the surface of the pressure roll (2). The releasability of the copying paper (10) after continuous fixation of 30,000 copies was not so different from that in the initial test, as is noted from Table 2 below.

TABLE 2

| Copying Paper | Surface Temp. of Heat Roll | | | |
|---|---|---|---|---|
| | 120° C. | 140° C. | 160° C. | 180° C. |
| Thick Paper | | | | |
| Lengthwise Direction | O | O | O | O |
| Crosswise Direction | O | O | O | Δ |
| Thin Paper | | | | |
| Lengthwise Direction | O | O | O | O |
| Crosswise Direction | O | O | O | X |

From the results of Table 2 above, it is understood that the toner release comprising two amine-modified oils still displays a high releasability even when applied to the heat roll (1) having an outer elastic material layer (6) made of a fluorine-containing rubber of Viton Rubber. Additionally, the toner release having the composition has an excellent heat-resistance and is free from chemical reaction of the amine-modified oils after use for a long period of time at a high temperature so that it may maintain the initial excellent releasability for a long period of time.

COMPARATIVE EXAMPLE 1

The same fixing device as that prepared in Example 1 was prepared, except that the toner release (14) was replaced by a mercapto-modified oil, and the same experiment as that in Experimental Example 1 was carried out. The results obtained are shown in Table 3 below.

TABLE 3

| Copying Paper | Surface Temp. of Heat Roll | | | |
|---|---|---|---|---|
| | 120° C. | 140° C. | 160° C. | 180° C. |
| Thick Paper | | | | |
| Lengthwise Direction | O | O | X | X |
| Crosswise Direction | Δ | O | X | X |
| Thin Paper | | | | |
| Lenthwise Direction | O | O | X | X |
| Crosswise Direction | X | Δ | X | X |

As is obvious from the results in Table 3 above, the releasability of the copying paper having a polyester toner thereon from the heat roll is poor when a mercapto-modified oil is used as the toner release (14).

EXPERIMENTAL EXAMPLE 3

In order to clarify the reason why the releasability of amine-modified oils is good, the following offset test was carried out. Precisely, 10 cm × 10 cm square plates of various materials were prepared and a toner release oil of a different kind was coated thin on each square plate, while the temperature of the plate was controlled in a temperature range of from 90° to 230° C. at regular intervals of every 10° C. Then, a copying paper (10) having a non-fixed toner image (11) as formed on the surface thereof was attached to the surface of the thus coated plate under pressure for several seconds and thereafter the copying paper (10) was rapidly peeled off from the plate, whereupon the toner image, if any, as offset to the surface of the square plate was checked. The results obtained are shown in Table 4 to Table 17 below.

As the test materials for the square test plates, various materials of 13 kinds of copper, aluminium, nickel, zinc, stainless steel, quartz glass, silicone RTV rubber, fluorosilicone rubber, Viton Rubber I (containing 70 parts by weight of MgO as a filler), Viton Rubber II (containing 70 parts by weight of PbO as a filler), Viton Rubber III (containing 20 parts of MgO and 50 parts by weight of $SiO_2$ as a filler), Viton Rubber IV (containing 20 parts by weight of MgO and 50 parts by weight of $Al_2O_3$ as a filler), and Viton Rubber V (containing 20 parts by weight of MgO and 50 parts by weight of ZnO as a filler) were used.

As the toner release (14) to be coated on the surface of the square plate of each of the above-mentioned materials, Dimethyl Oil γ having a viscosity of 300 cst, a mercapto-modified oil having a mercapto group concentration of 0.1% and a viscosity of 300 cp, and the same oil composition as that used in Example 1 were used.

As the toner, Toner A comprising 96 parts by weight of a polyester resin having a molecular weight (Mw) of 15,000, 1 part by weight of an antistatic agent and 3 parts by weight of a magenta pigment, and Toner B comprising 96 parts by weight of a styrene-acrylic resin having a molecular weight (Mw) of 100,000, 1 part by weight of an antistatic agent and 3 parts by weight of a magenta pigment were used.

In the following Tables, "⊙" indicates that the copying paper was well released with no problem; "O" indicates that the copying paper was released without offsetting of the toner; "Δ" indicates that the copying paper was released with the toner partially offsetting; and "X" indicates that the toner wholly offset after release of the copying paper. Where two symbols are given in one column, the two results were obtained in the test.

TABLE 4

Test Piece: Copper Plate

| Toner | Mercapto-modified Oil A | B | Amine Oil A | B | Dimethyl Oil γ A | B |
|---|---|---|---|---|---|---|
| Temperature (°C) | | | | | | |
| 90 | ○ | | ○ | | X | |
| 100 | ○ | | ○⊙ | | X | |
| 110 | ○⊙ | | ○⊙ | | X | |
| 120 | ○⊙ | | ○⊙ | | X | |
| 130 | ○ | ○ | ○⊙ | ⊙ | X | X |
| 140 | ○ | ⊙ | ○ | ○⊙ | X | X |
| 150 | △ | ⊙ | △ | ⊙ | X | X |
| 160 | X | ⊙ | △ | ⊙ | X | X |
| 170 | X | ⊙ | X | ⊙ | X | X |
| 180 | X | ⊙ | X | ⊙ | X | X |
| 190 | X | ○ | X | ⊙ | X | X |
| 200 | X | ○ | X | ○ | X | X |
| 210 | | ○△ | | ○ | | X |
| 220 | | △ | | △ | | X |

TABLE 5

Test Piece: Aluminum Plate

| Toner | Mercapto-modified Oil A | B | Amine Oil A | B | Dimethyl Oil γ A | B |
|---|---|---|---|---|---|---|
| Temperature (°C) | | | | | | |
| 100 | ○ | | ⊙ | | X | |
| 110 | ○ | | ⊙ | | X | |
| 120 | △ | ⊙ | ⊙ | | X | |
| 130 | △ | ○ | ○ | ⊙ | X | X |
| 140 | △ | ○ | ○△ | ⊙ | X | X |
| 150 | △ | ○ | ○ | ⊙ | X | X |
| 160 | X | ○ | X | ⊙ | X | X |
| 170 | X | ○ | X | ○ | X | X |
| 180 | X | △ | X | ○ | X | X |
| 190 | X | △ | X | ○△ | X | X |
| 200 | X | X | X | △ | X | X |
| 210 | X | X | X | △ X | X | X |
| 220 | | | | | | X |
| 230 | | | | | | X |

TABLE 6

Test Piece: Stainless Steel Plate

| Toner | Mercapto-modified Oil A | B | Amine Oil A | B | Dimethyl Oil γ A | B |
|---|---|---|---|---|---|---|
| Temperature (°C) | | | | | | |
| 100 | ○ | | ⊙ | | X | |
| 110 | X | | ⊙ | | X | |
| 120 | X | ○ | ⊙ | ○ | X | X |
| 130 | X | ○ | ○ | ○ | X | X |
| 140 | X | ⊙ | ○ | ⊙ | X | X |
| 150 | X | ⊙ | ○ | ⊙ | X | X |
| 160 | X | ⊙ | △ | ⊙ | X | X |
| 170 | X | ○ | △ | ⊙ | X | X |
| 180 | X | ○ | X | ○ | X | X |
| 190 | X | △ | X | ○ | | X |
| 200 | X | △ | X | ○ | | |
| 210 | X | △ | X | △ | | |
| 220 | | | | | | |
| 230 | | | | | | |

TABLE 7

Test Piece: Nickel Plate

| Toner | Mercapto-modified Oil A | B | Amine Oil A | B | Dimethyl Oil γ A | B |
|---|---|---|---|---|---|---|
| Temperature (°C) | | | | | | |
| 100 | ⊙ | | ⊙ | | X | |
| 110 | ○ | | ⊙ | | X | |
| 120 | ○ | ⊙ | ○ | ⊙ | X | X |
| 130 | ○ | ⊙ | ○ | ⊙ | X | X |
| 140 | △ | ⊙ | ○△ | ⊙ | X | X |
| 150 | X | ⊙ | △ | ⊙ | X | X |
| 160 | X | ○ | X | ○ | X | X |
| 170 | X | X | X | ○ | X | X |
| 180 | X | X | X | ○ | X | X |
| 190 | X | X | X | ○△ | X | X |
| 200 | X | X | X | △ | | X |
| 210 | X | X | X | X | | |
| 220 | | | | | | |
| 230 | | | | | | |

TABLE 8

Test Piece: Zinc Plate

| Toner | Mercapto-modified Oil A | B | Amine Oil A | B | Dimethyl Oil γ A | B |
|---|---|---|---|---|---|---|
| Temperature (°C) | | | | | | |
| 100 | X | | X | | | |
| 110 | X | | ⊙ | | X | |
| 120 | X | ○ | ⊙ | ○ | X | X |
| 130 | X | ○ | ○ | ○ | X | X |
| 140 | X | ○ | X | ○ | X | X |
| 150 | X | ○ | X | ○ | X | X |
| 160 | X | ⊙ | X | ⊙ | X | X |
| 170 | X | ○ | X | ○ | X | X |
| 180 | X | X | X | X | | X |
| 190 | X | X | X | X | | |
| 200 | X | X | X | X | | |
| 210 | X | | X | | | |
| 220 | | | | | | |
| 230 | | | | | | |

TABLE 9

Test Piece: Glass Plate

| Toner | Mercapto-modified Oil A | B | Amine Oil A | B | Dimethyl Oil γ A | B |
|---|---|---|---|---|---|---|
| Temperature (°C) | | | | | | |
| 100 | | | | | | |
| 110 | △ | | ⊙ | | X | |
| 120 | X | | ⊙ | | X | |
| 130 | X | ○ | ⊙ | ⊙ | X | X |
| 140 | X | ○ | ⊙ | ⊙ | X | X |
| 150 | X | ○ | ○ | ⊙ | X | X |
| 160 | X | ○ | ○ | ⊙ | X | X |

TABLE 9-continued

Test Piece
Glass Plate

| Toner | Mercapto-modified Oil A | B | Amine Oil A | B | Dimethyl Oil γ A | B |
|---|---|---|---|---|---|---|
| 170 | X | △ | X | ○ | X | X |
| 180 | X | X | X | X | X | X |
| 190 | X | X | X | X | X | X |
| 200 | X | X | X | X | X | X |
| 210 | | | | | | |
| 220 | | | | | | |
| 230 | | | | | | |

TABLE 10

Test Piece
Teflon Plate

| Toner | Mercapto-modified Oil A | B | Amine Oil A | B | Dimethyl Oil γ A | B |
|---|---|---|---|---|---|---|
| Temperature (°C.) | | | | | | |
| 100 | △ | | △ | | △ | |
| 110 | ○△ | | △ | | △ | |
| 120 | △ | ○ | △ | ⊙ | △ | ○△ |
| 130 | △ | ○ | ○△ | ⊙ | △ | ○ |
| 140 | △ | ○ | △ | ⊙ | △ | ⊙ |
| 150 | △ | ○ | △ | ⊙ | △ | ○ |
| 160 | X | ○ | △ | ⊙ | △ | ⊙ |
| 170 | X | ⊙ | △ | ⊙ | X | ○ |
| 180 | X | ○ | △ | ⊙ | X | ○ |
| 190 | X | ○ | X | ⊙ | X | ○ |
| 200 | X | ○⊙ | X | ⊙ | X | ○ |
| 210 | X | ○ | X | ⊙ | X | ○ |
| 220 | X | △ | X | ⊙ | X | ○ |
| 230 | | | | | | |

TABLE 11

Test Piece
Silicone RTV Plate

| Toner | Mercapto-modified Oil A | B | Amine Oil A | B | Dimethyl Oil γ A | B |
|---|---|---|---|---|---|---|
| Temperature (°C.) | | | | | | |
| 100 | ⊙ | | ⊙ | | ⊙ | |
| 110 | ⊙ | | ⊙ | | ⊙ | |
| 120 | ⊙ | ⊙ | ⊙ | ⊙ | ⊙ | ⊙ |
| 130 | ⊙ | ⊙ | ⊙ | ⊙ | ⊙ | ⊙ |
| 140 | ⊙ | ⊙ | ⊙ | ⊙ | ⊙ | ⊙ |
| 150 | ⊙ | ⊙ | ⊙ | ⊙ | ⊙ | ⊙ |
| 160 | ○ | ⊙ | ⊙ | ⊙ | ○ | ⊙ |
| 170 | △ | ⊙ | △ | ⊙ | △ | ⊙ |
| 180 | △ | ⊙ | △ | ⊙ | △ | ⊙ |
| 190 | △ | ⊙ | △ | ⊙ | X | ⊙ |
| 200 | X | ⊙ | △ | ⊙ | X | ⊙ |
| 210 | X | ⊙ | △ | ⊙ | X | ○ |
| 220 | X | △ | X | ⊙ | X | △ |
| 230 | | | | | | |

TABLE 12

Test Piece
Fluorosilicone Plate

| Toner | Mercapto-modified Oil A | B | Amine Oil A | B | Dimethyl Oil γ A | B |
|---|---|---|---|---|---|---|
| Temperature (°C.) | | | | | | |
| 100 | ○ | | ⊙ | | ○ | |
| 110 | ○ | | ⊙ | | ○ | |

TABLE 12-continued

Test Piece
Fluorosilicone Plate

| Toner | Mercapto-modified Oil A | B | Amine Oil A | B | Dimethyl Oil γ A | B |
|---|---|---|---|---|---|---|
| 120 | ○ | ⊙ | ⊙ | ⊙ | ○ | ○ |
| 130 | ○ | ⊙ | ○ | ⊙ | ○ | ○ |
| 140 | ○ | ⊙ | ○ | ⊙ | X | ○ |
| 150 | ○ | ⊙ | ○ | ⊙ | X | ○ |
| 160 | ○ | ○ | ○ | ⊙ | X | ○ |
| 170 | ○ | ○ | ○ | ⊙ | X | △ |
| 180 | △ | ○ | ○ | ⊙ | X | △ |
| 190 | X | △ | △ | ○ | X | △ |
| 200 | X | △ | △ | ○ | X | △ |
| 210 | | X | X | △ | X | X |
| 220 | | X | X | △ | X | X |
| 230 | | | | | | |

TABLE 13

Test Piece
Viton Rubber I

| Toner | Mercapto-modified Oil A | B | Amine Oil A | B | Dimethyl Oil γ A | B |
|---|---|---|---|---|---|---|
| Temperature (°C.) | | | | | | |
| 100 | ○ | | ⊙ | | ○ | |
| 110 | ○ | | ⊙ | | ○ | |
| 120 | ○ | ○ | ⊙ | ⊙ | ○ | ○ |
| 130 | ○ | ○ | ⊙ | ⊙ | ○ | ○ |
| 140 | △ | ○ | ⊙ | ⊙ | ○ | ○ |
| 150 | X△ | ○ | ⊙ | ⊙ | △ | ○ |
| 160 | X | ○ | ⊙ | ⊙ | X | ○ |
| 170 | X | ○ | ⊙ | ⊙ | X | ○ |
| 180 | X | ○ | ⊙ | ⊙ | X | △ |
| 190 | X | △ | ⊙ | ⊙ | X | X |
| 200 | X | △ | △ | ⊙ | X | X |
| 210 | X | △ | △ | ⊙ | X | X |
| 220 | X | △ | △ | ⊙ | X | X |
| 230 | | | | | | |

TABLE 14

Test Piece
Viton Rubber II

| Toner | Mercapto-modified Oil A | B | Amine Oil A | B | Dimethyl Oil γ A | B |
|---|---|---|---|---|---|---|
| Temperature (°C.) | | | | | | |
| 100 | ○ | | ⊙ | | ○ | |
| 110 | ○ | | ⊙ | | ○ | |
| 120 | ○ | ○⊙ | ⊙ | ⊙ | ○ | ○ |
| 130 | ○ | ⊙ | ○⊙ | ⊙ | ○ | ○ |
| 140 | ○ | ⊙ | ⊙ | ⊙ | ○ | ○ |
| 150 | ○⊙ | ⊙ | ○⊙ | ⊙ | △ | ○ |
| 160 | ⊙ | ⊙ | ○⊙ | ⊙ | X | ○ |
| 170 | △ | ⊙ | ○ | ⊙ | X | △ |
| 180 | △ | ○⊙ | △ | ⊙ | X | △ |
| 190 | △ | ○⊙ | △ | ⊙ | X | X |
| 200 | △ | ⊙ | △ | ⊙ | X | X |
| 210 | △ | ○⊙ | △ | ○⊙ | X | X |
| 220 | △ | ⊙ | △ | ⊙ | X | X |
| 230 | | | | | | |

TABLE 15

Test Piece Viton Rubber III

Toner Release

| Toner | Mercapto-modified Oil A | B | Amine Oil A | B | Dimethyl Oil γ A | B |
|---|---|---|---|---|---|---|
| Temperature (°C.) | | | | | | |
| 100 | O | | ⊙ | | O | |
| 110 | O | | ⊙ | | O | |
| 120 | △ | O | O | ⊙ | O | O |
| 130 | △ | ⊙ | O | ⊙ | O | O |
| 140 | X | O | O | ⊙ | △ | O |
| 150 | X | ⊙ | O | ⊙ | X | O |
| 160 | X | ⊙ | O | ⊙ | X | O |
| 170 | X | ⊙ | △ | ⊙ | X | △ |
| 180 | X | ⊙ | △ | ⊙ | X | X |
| 190 | X | ⊙ | △ | ⊙ | X | X |
| 200 | X | △ | △ | ⊙ | X | X |
| 210 | X | X | △ | ⊙ | X | X |
| 220 | X | X | X | ⊙ | X | X |
| 230 | | | | | | |

TABLE 16

Test Piece Viton Rubber IV

Toner Release

| Toner | Mercapto-modified Oil A | B | Amine Oil A | B | Dimethyl Oil γ A | B |
|---|---|---|---|---|---|---|
| Temperature (°C.) | | | | | | |
| 100 | O | | ⊙ | | O | |
| 110 | △ | | ⊙ | | O | |
| 120 | X | O | ⊙ | ⊙ | O | O |
| 130 | X | O | O | ⊙ | O | O |
| 140 | X | O | O | ⊙ | O | O |
| 150 | X | O | O | ⊙ | △ | O |
| 160 | X | O | O | ⊙ | △ | △ |
| 170 | X | △ | △ | ⊙ | X | △ |
| 180 | X | X | △ | ⊙ | X | △ |
| 190 | X | X | △ | ⊙ | X | X |
| 200 | X | X | △ | ⊙ | X | X |
| 210 | | X | △ | ⊙ | X | X |
| 220 | | X | △ | ⊙ | X | X |
| 230 | | | | | | |

TABLE 17

Test Piece Viton Rubber V

Toner Release

| Toner | Mercapto-modified Oil A | B | Amine Oil A | B | Dimethyl Oil γ A | B |
|---|---|---|---|---|---|---|
| Temperature (°C.) | | | | | | |
| 100 | O | | ⊙ | | O | |
| 110 | O | | ⊙ | | O | |
| 120 | O | O | ⊙ | ⊙ | O | O |
| 130 | O | O | ⊙ | ⊙ | O | O |
| 140 | X | O | ⊙ | ⊙ | △ | O |
| 150 | X | O | O | ⊙ | △ | O |
| 160 | X | O | O | ⊙ | X | △ |
| 170 | X | △ | △ | ⊙ | X | △ |
| 180 | X | X | △ | ⊙ | X | X |
| 190 | X | X | △ | ⊙ | X | X |
| 200 | X | X | △ | ⊙ | X | X |
| 210 | | | X | ⊙ | X | X |
| 220 | | | X | △ | X | X |
| 230 | | | | | | |

As is obvious from the results in the above-mentioned Tables, the oil composition as prepared and used in Example 1 is applicable to not only rubbers but also to other various materials to display the high releasability.

The reason could be considered because the functional amino group in the oil composition is easily bonded to metals, metal oxides and rubbers to form with ease a chemical adsorption film or chemical reaction film of the oil on the surface of the materials.

As opposed to the oil composition, the comparative dimethylsilicone oil was easily releasable from only silicone RTV rubber but it was almost hardly releasable from the other materials. Regarding another comparative mercapto-modified silicone oil, it had a somewhat better releasability than the dimethylsilicone oil and was well releasable from some Viton Rubbers. However, it was still hardly releasable from the other materials.

EXPERIMENTAL EXAMPLE 4

In order to compare the same oil composition as that used in Example 1 and a mercapto-modified oil with respect to the affinity with various materials, the present inventors carried out another test of measuring a contact angle of the oil-coated sample to a pure water. In the test, the test oil was coated on a test plate and the coated surface was treated in accordance with the method mentioned below.

Precisely, the test oil was coated on a test plate and the coated surface was rubbed with a cry paper so as to wipe off the oil as the first method. As the second method, the test oil was coated on a test plate in the same manner and the coated surface was washed with methyl alcohol.

As the test plate to be coated with the test oil, used were Viton Rubber I (containing 70 parts by weight of MgO as a filler), Viton Rubber II (containing 20 parts by weight of MgO and 50 parts by weight of SiO2 as a filler), stainless steel, aluminium, quartz glass, OHP sheet, and 40 μm-perfluoroalkoxy (PFA) coated plate.

The results obtained were shown in Table 18 below, where the number as parenthesized indicates a value of standard deviation.

TABLE 18

| Material | No Treatment | Mercapto-modified Oil 1st Treatment Method | 2st Treatment Method | Oil Composition of Example 1 1st Treatment Method | 2st Treatment Method |
|---|---|---|---|---|---|
| Viton Rubber I | 99.8 (0.9) | 102.6 (0.6) | 100.6 (0.7) | 105.2 (1.2) | 103.4 (0.8) |
| Viton Rubber II | — | 100.0 (1.2) | 100.4 (0.9) | 104.8 (0.7) | 103.4 (0.9) |
| Stainless Steel | 86.2 (4.8) | 97.6 (1.3) | 92.4 (1.0) | 106.6 (0.5) | 104.8 (1.8) |
| Aluminium | 90.2 (0.5) | 104.8 (0.8) | 100.0 (1.8) | 103.4 (1.5) | 97.2 (2.0) |
| Glass | 48.1 (0.8) | 71.8 (0.3) | 60.8 (1.8) | 87.8 (2.2) | 79.2 (1.6) |
| OHP Sheet | 48.0 (0.8) | 100.0 (0.3) | 78.2 (0.12) | 99.6 (1.8) | 90.0 (0) |
| PFA | 105 (1.3) | — | 105.0 (1.4) | — | 104.5 (1.7) |

As is obvious from the results in Table 18 above, the oil composition of Example 1, which comprises two amine-modified oils, has a higher contact angle to the test plate than the comparative mercapto-modified oil and therefore has a larger affinity therewith than the latter.

Additionally, it is also understood that a fairly large amount of the amine-modified oils still remained on the test plate even after the coated test plate was washed with methyl alcohol and therefore the affinity of the oils to the test plate is extremely large.

EXAMPLE 2

The same fixing device as that prepared in Example 1 was prepared, except that Amine A Oil (amine equivalent of 40,000) of an amine-modified oil α of formula (I) was used as the toner release (14). Using the device, the same test as that in Experimental Example 1 was carried out. The results obtained were same as those obtained in Experimental Example 1.

Next, the same running test as that in Experimental Example 1 was carried out, where the surface temperature of the heat roll (1) was fixed to be 140° C., the same three kinds of color toners were used, the same thick paper was conveyed under the same crosswise feeding condition and 30,000 copies were continuously fixed. As a result of the running test, no gel product was formed on both the surface of the heat roll (1) and the surface of the pressure roll (2), but the viscosity of the oil in the oil tank of storing the toner release (14) increased so that any further continuation of fixation process would cause supply of excessive oil to the coating roll (17) or would cause unevenness of supply of oil. The color of the toner release somewhat varied to a light brown color, which, however, did not cause any problem. The results of evaluation of the releasability of the copying paper in the test are shown in Table 19, from which it is understood that the releasability somewhat lowered than that in the initial test.

TABLE 19

| Copying Paper | Surface Temp. of Heat Roll | | | |
|---|---|---|---|---|
| | 120° C. | 140° C. | 160° C. | 180° C. |
| Thick Paper | | | | |
| Lengthwise Direction | ○ | ○ | ○ | ○ |
| Crosswise Direction | ○ | ○ | Δ | X |
| Thin Paper | | | | |
| Lengthwise Direction | ○ | ○ | ○ | ○ |
| Crosswise Direction | ○ | ○ | Δ | X |

EXPERIMENTAL EXAMPLE 5

In order to examine fluctuation, if any, of the releasability of copying paper, the wettability and the copy gloss, depending upon variation of the components of constituting the toner release (14), the present inventors carried out the following test.

Precisely, the amount of the aromatic amine-modified oil δ of formula (IV) as used in Example 1 was fixed to be 0.1%, while the other oil component to be blended with this was varied and selected from Amine B Oil, Amine C Oil and Amine D Oil of the amine-modified oil $α_1$ of formula (I) where the values of b and c were varied so that the amine equivalents of the respective compounds were thereby varied, Amine E Oil of the amine-modified oil $α_2$ of formula (I), Amine F Oil of the amine-modified oil β of formula (II), and the mercapto-modified oil. Using the toner release samples thus prepared, the copying paper releasability, wettability and copy gloss were examined.

The copying paper releasability was evaluated by the copying test as to whether or not the copying paper (10) adhered to and was engulfed into the heat roll (1) during the test. The wettability was evaluated by observing the wet degree of the surface of the heat roll (1) with the naked eye during the test. The copy gloss was evaluated by measuring the surface of the toner image-fixed paper with a surface gloss meter (Gloss Meter of Gloss Guard II (incidence and reflection angle: 75°), manufactured by Guardner Co., USA).

As a result of the test, Amine A Oil, Amine C Oil and Amine D Oil showed an excellent oil wettability, and the oil wettability of Amine E Oil and that of Amine F Oil was normal. As opposed to them, the mercapto-modified oil showed a poor oil wettability.

Figure 4:
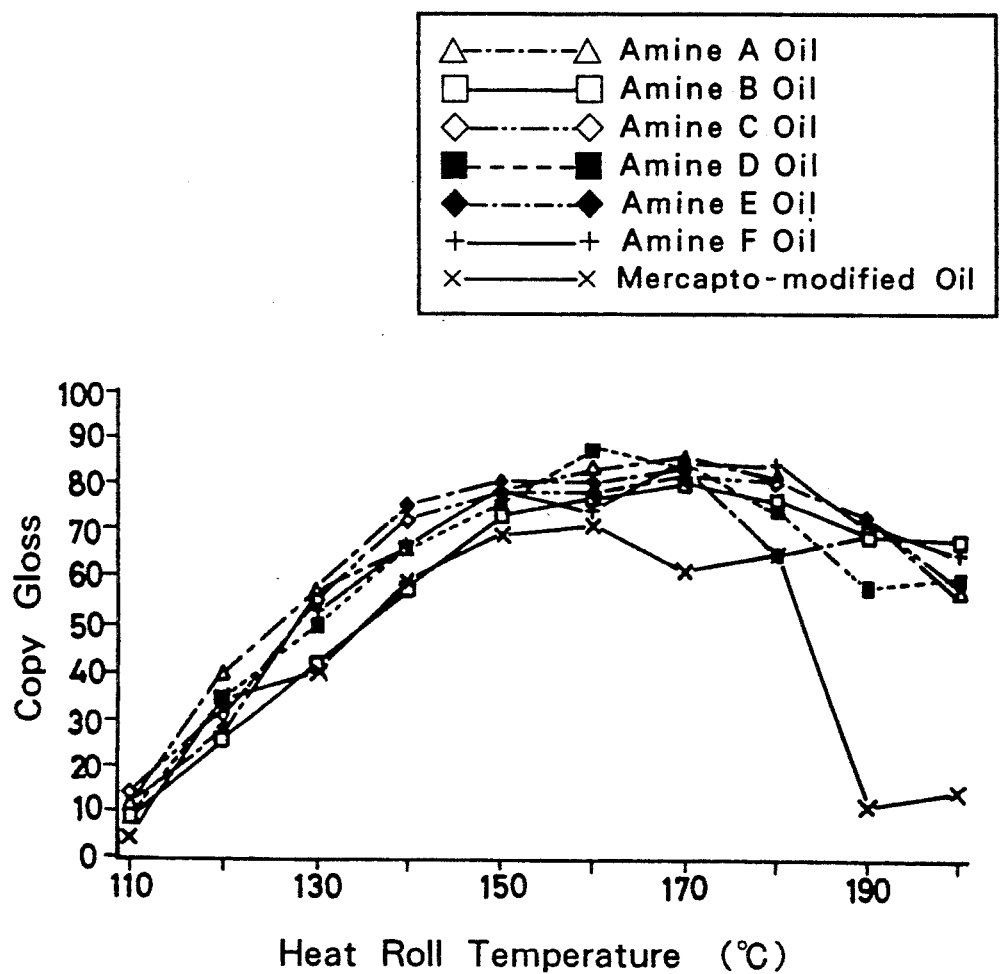
FIG. 4 is a graph of showing the relationship between the heat roll temperature and the copy gloss in Experimental Example 5.

The results of the copy gloss measured are shown in FIG. 4, from which it is noted that Amine D Oil gave a somewhat lowered copy gloss in a high temperature range. However, lowering of the copy gloss from Amine D Oil in a high temperature range did not cause any problem in the practical use. As opposed to them, the copy gloss obtained from the mercapto-modified oil was utterly poor. All the other oils attained satisfactory results of the same degree.

Regarding the copying paper releasability, Amine A Oil, Amine B Oil, Amine C Oil, Amine E Oil and Amine F Oil gave the same results as those in Table 19 above, while Amine D Oil gave the results as shown in Table 20 below. As opposed to them, the mercapto-modified oil gave the results as shown in Table 21 below.

TABLE 20

| Copying Paper | Surface Temp. of Heat Roll | | | |
|---|---|---|---|---|
| | 120° C. | 140° C. | 160° C. | 180° C. |
| Thick Paper | | | | |
| Lengthwise Direction | ○ | ○ | ○ | X |
| Crosswise Direction | ○ | Δ~X | X | X |
| Thin Paper | | | | |
| Lengthwise Direction | ○ | ○ | ○ | X |
| Crosswise Direction | ○ | X | X | X |

TABLE 21

| Copying Paper | Surface Temp. of Heat Roll | | | |
|---|---|---|---|---|
| | 120° C. | 140° C. | 160° C. | 180° C. |
| Thick Paper | | | | |
| Lengthwise Direction | ○ | ○ | X | X |
| Crosswise Direction | ○ | ○ | X | X |
| Thin Paper | | | | |
| Lengthwise Direction | ○ | ○ | X | X |
| Crosswise Direction | X | Δ | X | X |

As is obvious from the contents in the above-mentioned Tables, all the tested oils gave the same results except Amine D Oil and the mercapto-modified oil. The mercapto-modified oil had a poor wettability and gave a lowered copy gloss in a high temperature range, and it displayed a copying paper-releasability. On the other hand, Amine D Oil displayed a poor copying paper releasability under a high temperature condition. The reason could be considered because Amine E Oil has a high amino group concentration (where the amine equivalent is small, the amino group concentration is large) and therefore the amount of the methyl group in the oil, which has a great influence on the releasability of the oil itself, is lowered, so that the oil is to have a lowered releasability, like the same reason as that of the result of the above-mentioned copy gloss. Because of the results, it has been found that the amine-modified oil $α_1$ of formula (I) has a pertinent range for the amino group concentration of itself. Specifically, it has been found that an amine-modified oil $α_1$ of formula (I), which has an amino group concentration falling within the range of from that of Amine D Oil to that of Amine B Oil (from about 10,000 to about 140,000 as amine equivalent), gives a good releasability.

EXPERIMENTAL EXAMPLE 6

Amine D Oil was diluted with Dimethyl Oil $\gamma$ to 1/5 concentration or 1/18 concentration, so that the amine equivalent was adjusted to 38,200 or 137,520, respectively. Both the thus diluted samples were subjected to the same test of evaluating the copying paper releasability. In both cases, the same results as those in Table 19 were obtained. From the results, it was verified that addition of Dimethyl Oil $\gamma$ to Amine D Oil so as to increase the amine equivalent of the resulting blend improved the releasability of the oil blend.

EXAMPLE 3

Figure 5:
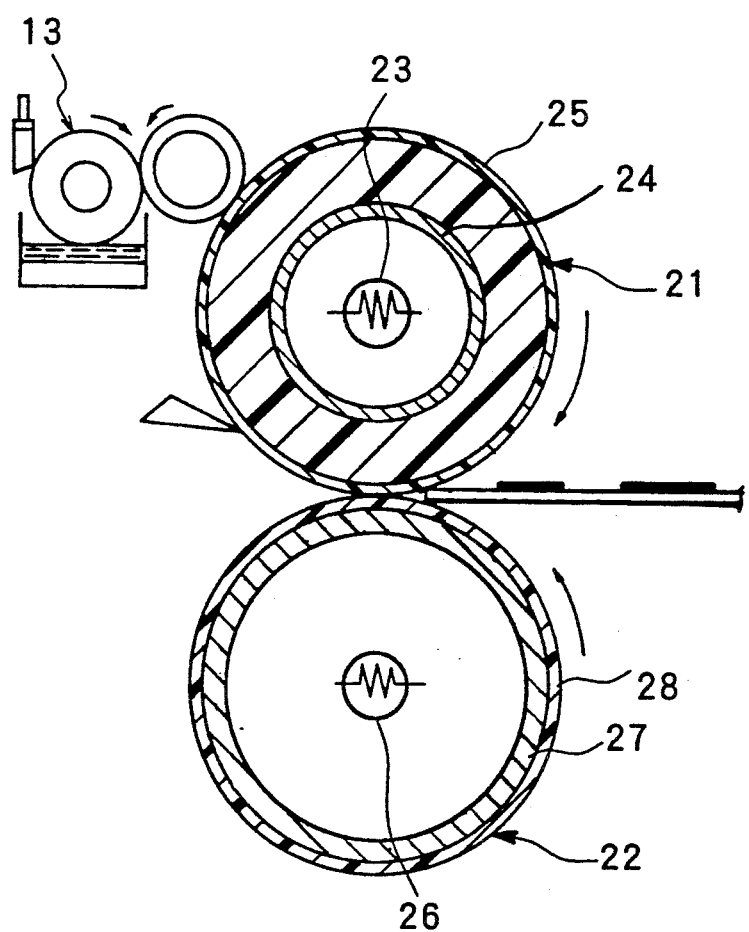
FIG. 5 is a cross-sectional explanatory view of showing a fixing device used in Example 2 of the invention.

FIG. 5 is referred to, which shows a fixing device to be used in the present Example 3.

Precisely, the main part of the fixing device of FIG. 5 is composed of a heat roll (21) and a pressure roll (22) made of a Teflon resin. The heat roll (21) has a 500-W Quartz Lamp (23) in the inside thereof, and it is composed of a base roll (24), which has an outer diameter of 44 mm$\phi$ and is made of a steel core material, and a silicone layer (25), which is provided on the base roll (24) optionally via a proper primer therebetween and which is made of a blend as prepared by well blending 100 parts by weight of a silicone compound (SH841U, product by Toray Co.), 100 parts by weight of a crystalline silica, 30 parts by weight of magnesium oxide (MgO #30, product by Kyowa Chemical Co.) and 0.8 part by weight of a vulcanizing agent (RC-4, product by Toray Co.), the rubber hardness of the vulcanized layer (25) being 62° as JIS hardness and the thickness (t) thereof being 3 mm.

The other pressure roll (22) has a 500-W Quartz Lamp (26) in the inside thereof, and it is composed of a base roll (27), which has an outer diameter of 50 mm$\phi$ and is made of a steel core material and a PFA layer (28) as provided on the base roll (27) optionally via a proper primer therebetween. The PFA layer (28) is formed on the base roll (27) by coating a powdery blend comprising 100 parts by weight of PFA (Perfluoroalkoxy MP-10, product by Mitsui-DuPont Co.) and 10 parts by weight of SiC (SiC #3000, product by Fujimi Kenmazai KK) by electrostatic powdery coating followed by baking the resulting coat thereon. The PFA layer (28) is polished to have an adjusted thickness of about 40 $\mu$m.

The heat roll (21) and the pressure roll (22) are kept in direct contact with each other under pressure by means of a pressure mechanism (not shown) and they form a nip width of 6 mm at the center part, like the device of Example 1. The heat roll (21) and the pressure roll (22) are rotated each to the indicated direction at a surface speed of 150 mm/sec.

Also in the present Example 3, a toner release (14) is supplied to the surface of the heat roll (21) via a toner release supply means (13), like the device of Example 1.

EXPERIMENTAL EXAMPLE 7

The present inventors actually made the device of FIG. 5 by way of trial and used it in a releasability test (initial test) where a copying paper (10) carrying a color toner image (11) thereon is processed for fixation of the image thereon to examine as to whether or not the toner offsets and the copying paper (10) is attached and engulfed to the heat roll (21), in the same way as in Experimental Example 1. As the toner release (14) to be supplied to the heat roll (21), the same oil composition as that used in Experimental Example 1 and Dimethyl Oil $\gamma$ were prepared and used in the test.

As the color toner image (11), three color toners of cyan, magenta and yellow were carried on the copying paper (10) each in an amount of 0.7 mg/cm$^2$, totaling 2.1 mg/cm$^2$. As the copying paper (10), either a thick paper (65 g/m$^2$) or a thin paper (56 g/m$^2$) was used. In both cases, the paper was conveyed in either the lengthwise direction or the crosswise direction for effecting the releasability test. In the test, the surface temperature of the heat roll (21) was varied from 120° C. to 180° C. at intervals of every 20° C., while that of the pressure roll (2) was constant to be 130° C.

The experimental results of the copying paper releasability test of the both cases are shown in Table 22 below, from which it is understood that the toner release of the oil composition has a copying paper releasability comparable to the conventional Dimethyl Oil $\gamma$, even when it is applied to the heat roll (21) having a silicone layer on the surface thereof.

TABLE 22

| Copying Paper | Surface Temp. of Heat Roll | | | |
|---|---|---|---|---|
| | 120° C. | 140° C. | 160° C. | 180° C. |
| Thick Paper | | | | |
| Lengthwise Direction | ○ | ○ | ○ | ○ |
| Crosswise Direction | ○ | ○ | ○ | ○ |
| Thin Paper | | | | |
| Lengthwise Direction | ○ | ○ | ○ | ○ |
| Crosswise Direction | ○ | ○ | ○ | △ |

EXAMPLE 4

Figure 6:
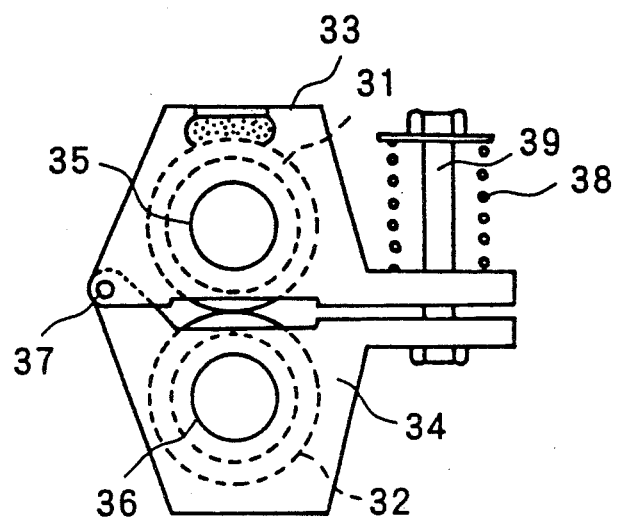
FIG. 6 is a side explanatory view of showing a fixing device used in Example 3 of the invention.

FIG. 6 is referred to, which shows a fixing device to be used in the present Example 4.

Figure 7:
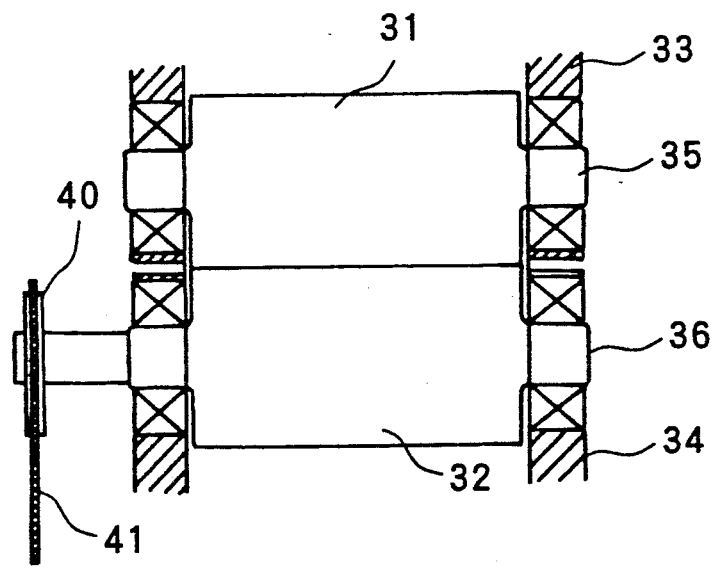
FIG. 7 is a horizontal cross-sectional explanatory view of FIG. 6.

Precisely, the fixing device is operated under pressure and is composed of a pair of metal rolls (31) and (32) which are kept in direct contact with each other under a determined pressure, as illustrated in FIG. 6 and FIG. 7.

The pair of rolls (31) and (32) each are made a carbon steel material (for example, S55C) having an outer diameter of 65 mm$\phi$, and the surface of each roll has been coated with a hard chromium plate.

The pair of rolls (31) and (32) are rotatably anchored to the upper frame (33) and the lower frame (34), respectively, by way of the rotary shaft of each roll, as shown in FIG. 6. The pair of rolls (31) and (32) are so arranged that they cross to each other with an angle of 1 or 2 degrees at the center of the center parts of the rotary shafts (35) and (36) of the both rolls (31) and (32), respectively, in order that a uniform pressure may be imparted to the both rolls throughout the whole length of the rolls. The lower frame (34) is anchored to the body of the image forming apparatus, and the upper frame (33) is set on the lower frame (34) in such a way that it may move up and down around the center of the support pin (37) at the top of the lower frame (34). The load between the both rolls (31) and (32) is imparted by the bolt (39) via the compression spring (38) positioned at the bottom ends of the frames (33) and (34), and the load is settled to be 800 kg. On the other hand, a driving power from a motor (not shown) is transmitted to the chain (41) via the sprocket (40) as equipped at the end of the lower roll (34), as shown in FIG. 7, whereby the both rolls are rotated at a surface speed of 100 mm/sec.

Also in the device of the present Example 4, a toner release (14) is coated on the surface of the upper roll (31) from the toner release supply means (13), like the mechanism of the device of Example 1.

A copying paper (10) carrying a non-fixed toner image (11) on the surface thereof inserted and passed between the two rolls (31) and (32), whereupon the non-fixed toner image (11) is fixed on the copying paper (10) under pressure.

EXPERIMENTAL EXAMPLE 8

The present inventors actually made the device of FIG. 6 by way of trial. As the toner release (14) to be supplied to the upper roll (31), the same oil composition as that used in Experimental Example 1 and Dimethyl Oil γ were prepared. Additionally, a pressure fixation toner having the composition mentioned below was prepared. Using this in an amount of 1 mg/cm², a solid image of a square of 3×3 cm was formed on a copying paper (10). Five sheets of the copying paper (10) thus carrying the solid image thereon were continuously introduced and passed between the rolls (31) and (32), whereupon the degree of the stain, if any, on the white paper as fixed to the cleaning pad was checked to evaluate the toner releasability of the toner release (14) used.

Composition of Pressure Fixation Toner:

| | |
|---|---|
| Shell Resin (Polyurea Resin) | 20 wt. pts. |
| Inner Polymer Liquid (Styrene-Acrylic Polymer Liquid) | 30 wt. pts. |
| Magnetic Powder | 50 wt. pts. |
| Pigment (Carbon) | 5 wt. pts. |

The same results as those in Experimental Example 1 were obtained. Precisely, in the case of using the oil composition, the amount of the offset toner as adhered to the white paper set on the cleaning pad attached to the upper fixing roll (31) was small, and the oil composition was verified to have an excellent toner releasability. As opposed to this, in the case of using Dimethyl Oil γ, the amount of the offset toner as adhered to the white paper set on the cleaning pad attached to the upper fixing roll (31) was large or medium. From the results, it is understood that Dimethyl Oil γ is not suitable as a releasing agent (14) for pressure fixation.

EXPERIMENTAL EXAMPLE 9

The present inventors carried out another experiment of testing the variation, if any, of the copying paper releasability, using various oil compositions comprising Amine A Oil and Aromatic Amine-modified Oil δ in various proportions. Precisely, the proportion of Amine A Oil to Aromatic Amine-modified Oil δ was varied in such a way that the proportion of Aromatic Amine-modified Oil δ was 0.5 part by weight, 1 part by weight, 2 parts by weight, 3 parts by weight or 5 parts by weight each to 1,000 parts by weight of Amine A Oil. The copying paper releasability test was effected under the same condition as that in Experimental Example 1.

In all the test cases where the proportion of Aromatic Amine-modified Oil δ to Amine A Oil was variously changed, the same results as those in Table 1 above were obtained. However, it was found that, where the proportion of Aromatic Amine-modified Oil δ is more than 5 parts by weight, the copying paper releasability of the toner release lowers and the compatibility of the component to Amine A Oil lowers to cause precipitation of the component in the toner release composition and to cause light brown coloration of the composition.

EXAMPLE 5 AND EXPERIMENTAL EXAMPLE 10

The same fixing device as illustrated in FIG. 1 and FIG. 2 was prepared, except that a 700 W-Quartz Lamp (3) was set in the inside of the heat roll (1), the outer elastic material layer (6) had a thickness of 30 μm, a 300 W-Quartz Lamp (7) was set in the inside of the pressure roll (2), and the outer elastic material layer (9) had a thickness of 30 μm. The surface temperature of the pressure roll (2) was settled to be constantly 150° C., and the surface speed of both the heat roll and the pressure roll (2) was settled to be constantly 160 mm/sec.

As the toner release (14) was used an amine-modified oil β of formula (II), whereupon the values of b and c were varied to prepare various Amine-modified Oil β's each having a different amine equivalent as indicated in Table 23. All these oils had a viscosity of about 320 cs. The surface temperature of the heat roll (1) was varied to be 130° C., 150° C., 170° C. or 190° C., and only a thin paper was used in the test. The other conditions were same as those in Experimental Example 1, and the copying paper releasability of the test oils was evaluated. The results obtained are shown in Table 23 below.

TABLE 23

| Amine Equivalent of Toner Release | Copy Paper Feeding Direction | Surface Temp. of Heat Roll | | | |
|---|---|---|---|---|---|
| | | 130° C. | 150° C. | 170° C. | 190° C. |
| 7,500 | Lengthwise Direction | ○ | ○ | ○ | ○ |
| | Crosswise Direction | ○ | ○ | ○ | ○ |
| 10,000 | Lengthwise Direction | ○ | ○ | ○ | ○ |
| | Crosswise Direction | ○ | ○ | ○ | ○ |
| 36,500 | Lengthwise Direction | ○ | ○ | ○ | ○ |
| | Crosswise Direction | ○ | ○ | ○ | ○ |
| 100,000 | Lengthwise Direction | ○ | ○ | ○ | ○ |
| | Crosswise Direction | ○ | ○ | ○ | ○ |
| 190,000 | Lengthwise Direction | ○ | ○ | ○ | ○ |
| | Crosswise Direction | ○ | ○ | ○ | ○ |
| 400,000 | Lengthwise Direction | ○ | ○ | ○ | ○ |
| | Crosswise Direction | ○ | ○ | ○ | ○ |
| 500,000 | Lengthwise Direction | ○ | ○ | ○ | ○ |
| | Crosswise Direction | ○ | ○ | ○ | ○ |
| 600,000 | Lengthwise Direction | ○ | ○ | ○ | △ |
| | Crosswise Direction | X | △ | X | X |

From the results, it is understood that the amine-modified oil β of formula (II) having an amine equivalent of from 7,500 to 500,000 may well be applied to even a thin copying paper as a toner release and that fixation may well be effected with no problem of toner releasability at a fixing temperature of falling within the range between 130° C. to 190° C.

EXPERIMENTAL EXAMPLE 11

As a toner release (14), various oil compositions each comprising an amine-modified oil β of formula (II) having an amine equivalent of 7,500 and Dimethyl Oil γ (viscosity: 300 cst) and each having an amine equivalent as indicated in Table 24 below were used. The other conditions were same as those in Experimental Example 10 of Example 5 mentioned above. The copying paper releasability was tested for all the test oil compositions, and the results obtained are shown in Table 24.

TABLE 24

| Amine Equivalent of Toner Release | Composition (*1) | Copy Paper Feeding Direction | Surface Temp. of Heat Roll | | | |
|---|---|---|---|---|---|---|
| | | | 130° C. | 150° C. | 170° C. | 190° C. |
| 30,000 | 1:3 | Lengthwise Direction | O | O | O | O |
| | | Crosswise Direction | O | O | O | O |
| 150,000 | 1:19 | Lengthwise Direction | O | O | O | O |
| | | Crosswise Direction | O | O | O | O |
| 518,000 | 1:68 | Lengthwise Direction | O | O | O | O |
| | | Crosswise Direction | O | O | O | O |
| 600,000 | 1:79 | Lengthwise Direction | O | O | O | Δ |
| | | Crosswise Direction | X | Δ | X | X |

(Note)
(*1): Weight Ratio of Amine-modified oil β/Dimethyl Oil γ

As is noted in Table 24 above, the same results as those in Experimental Example 10 were obtained also in the present Experimental Example 11.

EXPERIMENTAL EXAMPLE 12

After the test of the previous Experimental Example 10 where a toner release having an amine equivalent of 36,500 and a viscosity of 320 was used, the present running test was carried out, in which the temperature of the heat roll (1) was settled to be 150° C. and, as a copying medium (10), 30,000 sheets of thick papers were continuously fed into the fixation device for continuous running fixation, the copying paper feeding direction being crosswise. The other conditions were same as those in Experimental Example 10 of Example 5.

After completion of the present running test, the surface of the heat roll (1) and that of the pressure roll (2) were checked whereupon neither formation of any gel product nor generation of fog, as a pre-stage of the former formation, was recognized. Additionally, after the running test, another releasability test was carried out, using thin copying papers. As a result of the test, the releasability of the tested thin papers was good under the temperature condition of falling within the range of from 130° to 190° C., like the previous Experimental Example 10.

EXAMPLE 6 AND EXPERIMENTAL EXAMPLE 13

The same device of FIG. 5 of Example 3 was prepared, except that the surface speed of the heat roll (21) and the pressure roll (22) was 160 mm/sec and that an amine-modified oil β of formula (II), having an amine equivalent of 100,000 and a viscosity of 300 cst, was used as a toner release (14) in place of the oil composition.

Using the device thus prepared, a releasability test (initial test) of testing as to whether or not the copying paper (10) adhere to and is engulfed into the heat roll (21) was carried out under the same condition as that in the previous Experimental Example 7. Additionally, another releasability test was also effected, in which a thin paper (56 g/m²) was used as the copying paper (10), the surface temperature of the heat roll (21) was varied within the range of from 130° C. to 190° C. at intervals of every 20° C. and the surface temperature of the pressure roll (22) was settled to be 150° C. In the both tests, the toner release displayed an excellent copying paper releasability comparable to the conventional Dimethyl Oil γ, like the results of the previous Experimental Example 7.

EXAMPLE 6 AND EXPERIMENTAL EXAMPLE 14

The same device of FIG. 6 of Example 4 was prepared, except that an amine-modified oil β of formula (II), having an amine equivalent of 100,000 and a viscosity of 300 cs, was used as a toner release (14) in place of the oil composition. Using the device thus prepared, the same releasability test as that in Experimental Example 8 was carried out, in which the degree of the stain, if any, of the white paper as attached to the cleaning pad was measured. In the test, the same results as those in Experimental Example 8 were obtained. Precisely, where the amine-modified oil β of formula (II) mentioned above was used, the amount of the offset toner as adhered to the white paper was small and therefore the toner release displayed an excellent releasability. As opposed to this, where the conventional Dimethyl Oil γ was used, the amount of the offset toner as adhered to the white paper was large or medium. From the results, it is obvious that the amine-modified oil β of formula (II) mentioned above is suitable also as the toner release (14) for pressure fixation.

EXPERIMENTAL EXAMPLE 15

As the toner release (14) was used an amine modified oil β of formula (II), having an amine equivalent of 100,000 and a viscosity of 300 cst, a mercapto-modified oil or Dimethyl Oil γ. The same device of FIG. 1 and FIG. 2 as that used in Example 5 was used. Tests of examining the copying paper releasability, wettability and copy gloss were carried out under the same conditions as those in Experimental Example 5.

Figure 8:
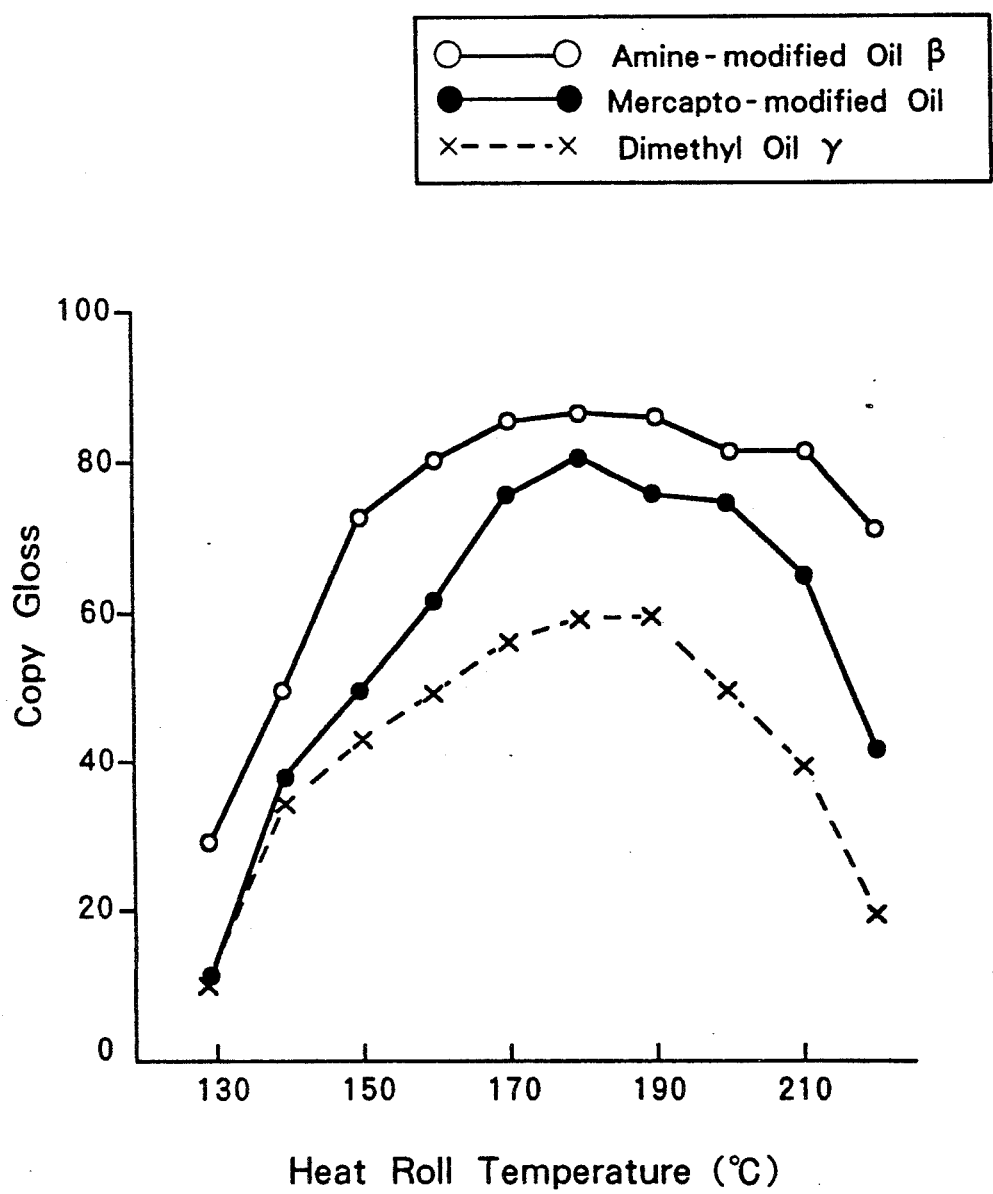
FIG. 8 is a graph of showing the relationship between the heat roll temperature and the copy gloss in Experimental Example 15.
Figure 9:
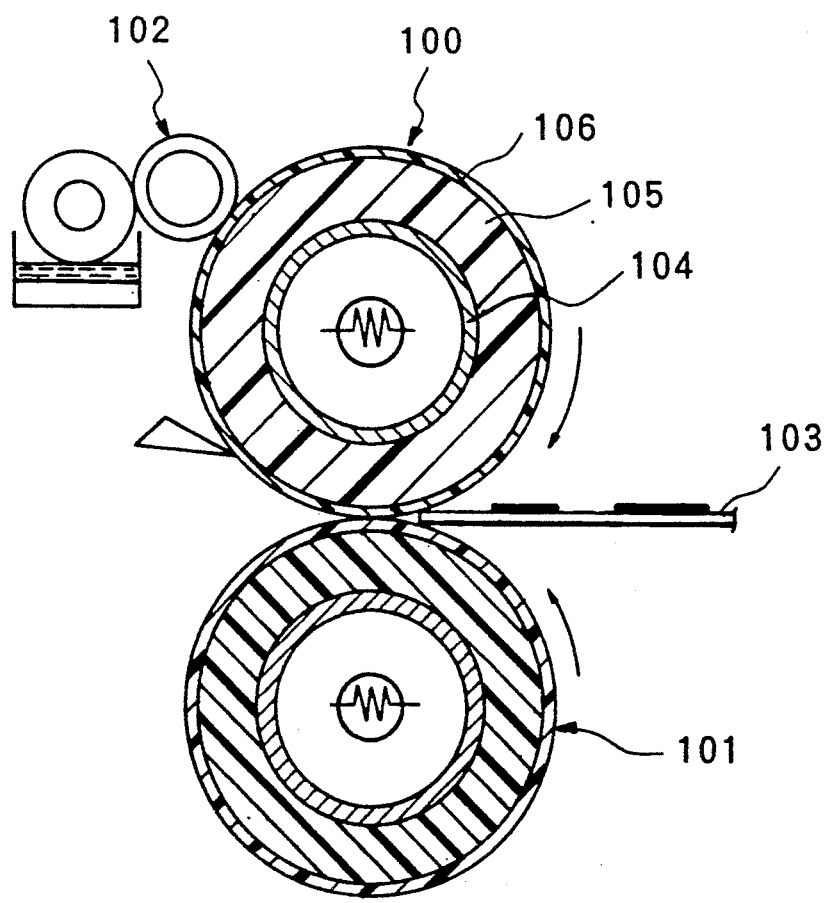
FIG. 9 is a cross-sectional explanatory view of showing a conventional fixing device.

From the test results, it was noted that the amine-modified oil 62 displayed an excellent wettability but the other mercapto-modified oil and Dimethyl Oil γ did not. Regarding the copy gloss, the amine-modified oil β gas an excellent copy gloss, as shown in FIG. 8. However, the copy gloss obtained in the case of using the mercapto-modified oil could not be said good but the oil has no trouble in practical use thereof. As opposed to them, the copy gloss obtained in the case of using Dimethyl Oil γ was quite poor. The results of the copying paper releasability of each oil (toner release) obtained in the present test are shown in Table 25 below.

TABLE 25

| Toner Release | Copy Paper Feeding Direction | Surface Temp. of Heat Roll | | | |
|---|---|---|---|---|---|
| | | 120° C. | 140° C. | 160° C. | 180° C. |
| Amine-modified Oil β | Lengthwise Direction | O | O | O | O |
| | Crosswise Direction | O | O | O | O |
| Dimethyl Oil γ | Lengthwise Direction | Δ | O | O | X |
| | Crosswise Direction | X | X | X | X |

TABLE 25-continued

| Toner Release | Copy Paper Feeding Direction | Surface Temp. of Heat Roll | | | |
|---|---|---|---|---|---|
| | | 120° C. | 140° C. | 160° C. | 180° C. |
| Mercapto-modified Oil | Lengthwise Direction | O | O | O | O |
| | Crosswise Direction | X | X | X | X |

EXPERIMENTAL EXAMPLE 16

The same device of FIG. 1 and FIG. 2 as that used in Example 5 was prepared, using an amine-modified oil β of formula (II), having an amine equivalent of 100,000 and a viscosity of 300 cst, a mercapto-modified oil or Dimethyl Oil γ as the toner release (14). The heating temperature of the heat roll (1) and the pressure roll (2) was settled to be 160° C., and the device was subjected to continuous blank operation for 80 hours in which only the two rolls were latched and rotated with feeding no copying paper thereto.

After the blank operation, the surfaces of the both rolls (1) and (2) were wiped off with an alcohol and the thus wiped surfaces were observed with the naked eye to check as to whether or not they had any gel product or they were fogged. As a result, the surfaces had no problem in all the test cases. Accordingly, it is understood from the test results that the amine-modified oil β had an excellent heat-resistance comparable to the conventional mercapto-modified oil and Dimethyl Oil γ.

In accordance with the fixing method and device of the present invention, the toner release has not only an excellent toner releasability but also an excellent heat-resistance. Accordingly, the toner release is durable to use for a long period of time under a high temperature condition without deterioration. Using the toner release of the present invention, therefore, the toner image may well be fixed on the copying medium with no unfavorable problems.

While the invention has been described in detail and with reference to specific embodiments thereof, it will be apparent to one skilled in the art that various changes and modifications can be made therein without departing from the spirits and scope thereof.

What is claimed is:

1. A fixing device where a copying medium carrying a non-fixed toner image thereon is passed between a pair of fixing rolls as being kept in direct contact with each other under pressure so as to fix the non-fixed toner image on the copying medium, the device being characterized by having a toner release supply means of supplying a toner release oil composition to at least the fixing roll of being brought into contact with the non-fixed toner image of the said pair of fixing rolls, the toner release oil composition at least containing, as an active ingredient, a functional group-containing organopolysiloxane of a general formula (I):

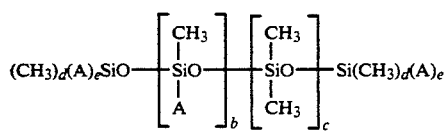

(I)

where A represents —R$^1$—X or —R$^1$—O—Y$_f$—H (in which R$^1$ represents an alkylene group having from 1 to 8 carbon atoms; X represents —NH$_2$ or —NHR$^2$NH$_2$ with R$^2$ of being an alkylene group having from 1 to 8 carbon atoms; Y represents an alkylene group having from 2 to 4 carbon atoms; and f represents an integer of from 0 to 10); b and c each satisfy the conditions of $0 \leq b \leq 10$ and $10 \leq c \leq 1,000$ but both b and c must not be 0 at the same time; and d is 2 or 3, e is 0 or 1, and d+e=3; the organopolysiloxane having a viscosity of from 10 to 100,000 cs at 25° C.

2. The fixing device as claimed in claim 1, in which the functional group-containing organopolysiloxane of constituting the toner release is one represented by a general formula (II):

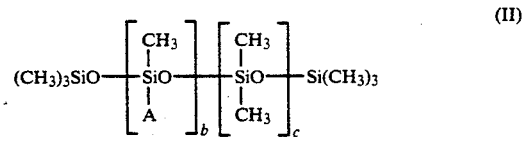

(II)

where A represents —R$^1$—X, in which R$^1$ represents an alkylene group having from 1 to 8 carbon atoms, and X represents —NH$_2$; and b and c each satisfy the conditions of $0 < b \leq 10$ and $10 \leq c \leq 1,000$.

3. The fixing device as claimed in claim 1 or 2, in which the toner release oil composition further contains as an additional active ingredient an organopolysiloxane of a general formula (III):

(III)

where R$^5$ represents an alkyl or aryl group having from 1 to 8 carbon atoms, and $1.95 < a < 2.20$.

4. The fixing device as claimed in any one of claims 1 to 7, in which the toner release oil composition further contains as an additional active ingredient an aromatic amino group-containing organopolysiloxane of a general formula (IV):

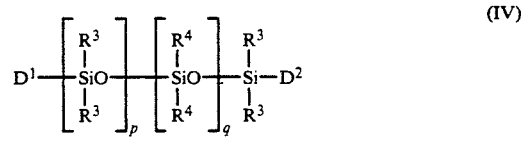

(IV)

where R$^3$ represents an alkyl or aryl group having from 1 to 8 carbon atoms; R$^4$ represents an aromatic amino group of a formula:

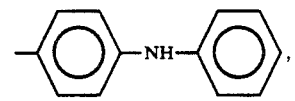

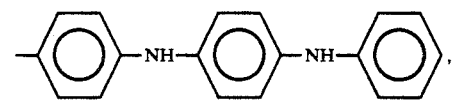

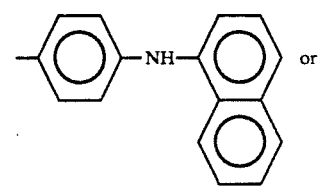

or

-continued
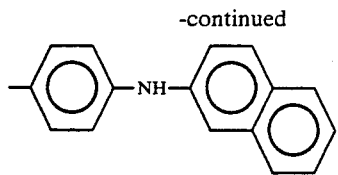
$D^1$ and $D^2$ each represents the above-mentioned $R^3$ or $-O-R^4$; p and q each satisfy the conditions of being $0 \leq p \leq 100$ and $0 \leq q \leq 10$; and when q=0, at least one of $D^1$ and $D^2$ is $-O-R^4$.
* * * * *

UNITED STATES PATENT AND TRADEMARK OFFICE
CERTIFICATE OF CORRECTION

PATENT NO. : 5,157,445
DATED : October 20, 1992
INVENTOR(S) : Yoshio Shoji et al.

It is certified that error appears in the above-identified patent and that said Letters Patent is hereby corrected as shown below:

Claim 2, column 26, line 10, after "release", insert --oil composition--.

Claim 4, column 26, line 35, change "to 7" to --to 3--.

Signed and Sealed this

First Day of February, 1994

Attest:

BRUCE LEHMAN

Attesting Officer     Commissioner of Patents and Trademarks